United States Patent [19]

Hwang et al.

[11] Patent Number: 4,635,209

[45] Date of Patent: Jan. 6, 1987

[54] OVERSPEED PROTECTION CONTROL ARRANGEMENT FOR A STEAM TURBINE GENERATOR CONTROL SYSTEM

[75] Inventors: Eddie Y. Hwang, Winter Park, Fla.; Wu-Shi Shung, South Windsor, Conn.

[73] Assignee: Westinghouse Electric Corp., Pittsburgh, Pa.

[21] Appl. No.: 666,711

[22] Filed: Oct. 31, 1984

[51] Int. Cl.⁴ .................. G06F 15/46; G05B 15/00; F01D 17/02

[52] U.S. Cl. .................................. 364/494; 364/181; 364/174; 60/646

[58] Field of Search ............... 364/494, 136, 178, 134, 364/138, 174, 186, 181, 184; 60/646; 415/17; 290/40 R

[56] References Cited

U.S. PATENT DOCUMENTS

| | | | |
|---|---|---|---|
| 3,552,872 | 1/1971 | Giras et al. | 415/17 |
| 3,643,437 | 2/1972 | Birnbaum | 290/40 R X |
| 3,741,246 | 6/1973 | Braytenbah | 415/17 X |
| 3,878,401 | 4/1975 | Ronnen | 290/40 R X |
| 3,898,441 | 8/1975 | Davis et al. | 290/40 R X |
| 3,939,328 | 2/1976 | Davis | 364/161 |
| 3,975,622 | 8/1976 | Horn et al. | 364/146 |
| 4,017,056 | 4/1977 | Schwalenstocker et al. | 91/363 R |
| 4,025,765 | 5/1977 | Giras et al. | 290/40 R X |
| 4,028,532 | 6/1977 | Reuther | 364/494 |
| 4,029,951 | 6/1977 | Berry et al. | 290/40 R X |
| 4,029,952 | 6/1977 | Giras et al. | 290/40 R X |
| 4,031,372 | 6/1977 | Davis | 290/40 R X |
| 4,035,624 | 7/1977 | Lardi | 290/40 R X |
| 4,071,897 | 1/1978 | Groves, Jr. et al. | 364/494 |
| 4,099,237 | 7/1978 | Zitelli et al. | 364/494 |
| 4,118,772 | 10/1978 | Takada | 364/138 X |
| 4,149,235 | 4/1979 | Froyd et al. | 364/134 X |
| 4,153,198 | 5/1979 | Eki et al. | 364/494 X |
| 4,166,221 | 8/1979 | McGaha et al. | 290/40 R |
| 4,177,387 | 12/1979 | Malone | 290/40 R |
| 4,179,742 | 12/1979 | Stern et al. | 364/494 |
| 4,205,380 | 5/1980 | Braytenbah | 364/494 |
| 4,263,647 | 4/1981 | Merrell et al. | 364/136 |
| 4,280,060 | 7/1981 | Kure-Jensen et al. | 364/494 X |
| 4,368,520 | 1/1983 | Hwang et al. | 364/494 |

Primary Examiner—Edward J. Wise
Attorney, Agent, or Firm—D. Schron

[57] ABSTRACT

In a steam turbine control system three overspeed protection circuits (OPC) are provided, each one being identical to the others and each having a programmable digital computer in two-way data communication with a master controller, as well as with the other OPCs. Speed transducers adjacent the turbine shaft provide speed indicative signals to the respective OPCs which calculate extremely precise RPM values utilizing an adaptive filter in the derivation process.

17 Claims, 16 Drawing Figures

OVERSPEED PROTECTION CONTROL ARRANGEMENT FOR A STEAM TURBINE GENERATOR CONTROL SYSTEM

BACKGROUND OF THE INVENTION

1. Field of the Invention

The invention in general relates to steam turbine control systems and more particularly to overspeed protection control circuitry for deriving extremely accurate turbine speed signals.

2. Description of the Prior Art

In the field of steam turbine control, many systems exist which utilize a primary controller, in the form of a programmable digital computer, as well as a redundant or backup computer. The computer's capability to monitor, memorize, calculate, test and make instant decisions results in a control system which is faster, more accurate and far superior to purely mechanical or analog control systems.

An improved digital control system for a steam turbine has been developed which includes primary and redundant base controllers as well as interconnected and coordinated functional modules each having its own microcomputer to execute specific functions. That is, the control system structure is based upon distributed processing, with this modular architecture providing for greater flexibility and minimizing risk of control loss and total system shutdown due to any single failure. The system can be serviced while on-line without the necessity for shutting down the turbine's operation, and servicing of the apparatus can be accomplished in a minimal amount of time. One example of such distributed processing turbine control system is described and claimed in U.S. Pat. No. 4,368,520 assigned to the assignee of the present invention and hereby incorporated by reference.

The control system of the referenced patent includes a plurality of valve position control circuits for controlling the steam admission valves, with each circuit including its own programmable digital computer in two-way digital communication with a base controller from which it receives signals relative to the individual valve control. The valve position control circuits are selectively addressable to receive a particular valve related signal from the controller to in turn generate an individual valve drive signal for the valve it is controlling. The system is operable both in an automatic and a manual mode and when in the manual mode all of the valve position control circuits function to receive operator-entered command signals.

Two channels of overspeed protection control (OPC) are provided with each OPC including its own programmable digital computer and operable in response to certain speed indicative pulse input signals to generate presumed valid RAM turbine speed signals which are used for control purposes and are communicated via a digital data link to the base controller.

The present invention relates to an improved OPC arrangement which provides for a faster response time and higher precision in the speed measurement, resulting in a precise speed measurement signal with a resolution of better than 1 RPM. In addition, the improved OPC arrangement is operable with different rated speeds which may be encountered in different turbine systems such as boiler feed pump turbines, fossil-fired, and nuclear, by way of example.

SUMMARY OF THE INVENTION

An improved OPC arrangement for a steam turbine control system having a control of the type described includes at least three OPC circuits each including programmable digital computer means in two-way digital data communication with a main controller. A speed transducer for each OPC is positioned to derive an output signal indicative of the turbine shaft rotational speed, and each OPC includes a speed reader circuit which converts a respective one of the speed transducer signals to a pulse waveform preferably of a frequency greater than the frequency of the received transducer signal.

Means are provided for accumulating and counting the pulses of the waveform in a predetermined period of time and to transfer the counter to the digital computer means of the OPC. In response to this count the digital computer means calculates a turbine speed signal (RPM) and provides this signal to the other OPCs, whereupon each of which compares its own generated RPM signal with those received from the other OPCs to compare it for validation purposes.

Adaptive filter means is provided and is operable to change its bandwidth in response to turbine speed so as to provide extremely precise RPM readings which closely track actual turbine speed.

DESCRIPTION OF THE PREFERRED EMBODIMENTS

Figure 1:
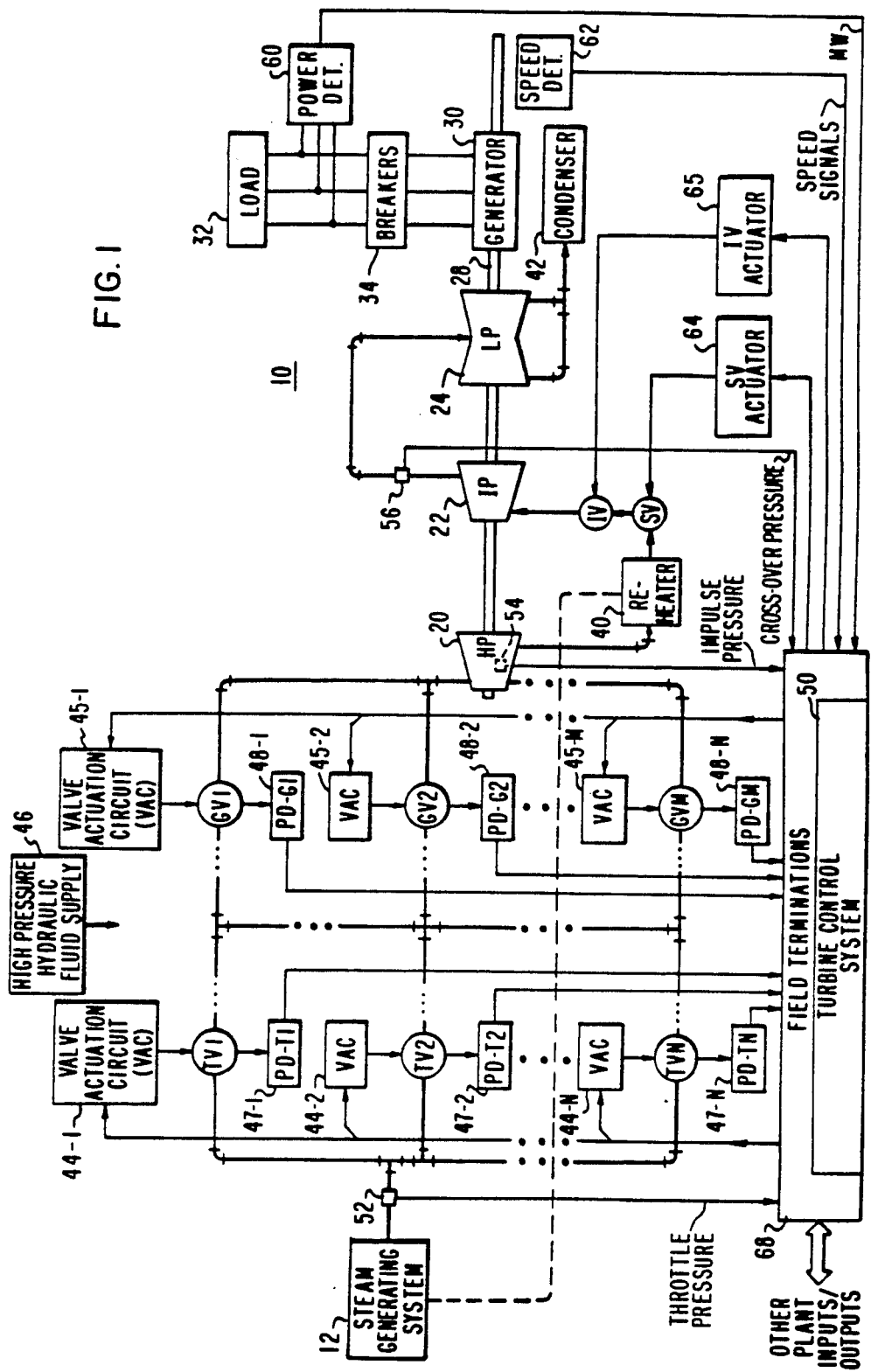
FIG. 1 is a block diagram of a steam turbine-generator power plant.

FIG. 1 depicts a steam turbine generator power plane and is illustrated as a fossil fired, tandem compound, single reheat turbine generator unit by way of example. The arrangement includes a plurality of steam admission valves such as throttle valves TV1-TVN and governor valves GV1-GVM disposed in the meain steam header which couples a steam turbine system 10 to a steam generating system 12. In a typical arrangement there may be four throttle valves (N=4) and eight governor valves (M=8).

Turbine system 10 includes a high pressure (HP) turbine 20, an intermediate pressure (IP) turbine 22 and a low pressure (LP) turbine 24, all of which are coupled to a common shaft 28 to drive an electrical generator 30 which supplies power to a load 32 through main breakers 34.

Steam exiting the HP turbine 20 is normally reheated in a reheater unit 40 generally a part of steam generating system 12 as indicated by the dotted line connection. Reheated steam is supplied to IP turbine 22 through one or more stop valves SV and one or more interceptor valves IV disposed in the steam line. Steam from the IP turbine 22 is provided to LP turbine 24 from which the steam is exhausted into a conventional condenser 42.

With the main breakers 34 open, the torque as produced by the inlet steam, is used to accelerate the turbine shaft 28 from turning gear to synchronous speed. As long as the main breakers 34 are open, the turbine is spinning with no electrical load and it is operative in a speed control mode. Once the shaft frequency is synchronized to the frequency of the load 32, which may be a power system network, the breakers 34 are closed, and power is delivered to the load by the generator 30. When the breakers 34 close, the net torque exerted on the turbine rotating assemblies of the HP, IP and LP turbines controls the amount of power supplied to the load 32, while shaft speed is governed by the frequency of the power system network. Control of steam inlet under these conditions is generally referred to as load control, during which a speed feedback signal is applied to the load setpoint to make the unit responsive to changes in power system frequency. The feedback signal is proportional to the difference between actual turbine speed and rated turbine speed and for precise regulation the measurement of actual turbine speed must be extremely accurate to a resolution measurable in tenths of an RPM.

In order to control the turbine during operation, the steam admitting throttle and governor valves are controlled in position by respective valve actuation circuits 44 and 45 which receive high pressure fluid from a high pressure hydraulic fluid supply 46. Thus, valve actuation circuits 44-1 through 44-N respectively control throttle valves TV1–TVN and valve actuation circuits 45-1 through 45-M control governor valves GV1–GVM. Position detectors 47 and 48 are coupled to the valves to provide respective feedback signals indicative of valve position. Position detectors 47-1 through 47-N are coupled to respective throttle valves TV1–TVN and position detectors 48-1 through 48-M are coupled to respective governor valves GV1–GVM.

Control signals for operation of the valve actuation circuits are derived from a turbine control system 50 which utilizes indications of various plant parameters for control purposes. Among the various parameters utilized is an indication of throttle pressure derived from a throttle pressure detector 52 in the main steam line between the steam generating system 12 and the throttle valves. A detector 54 within the HP turbine 20 provides an indication of impulse pressure which is proportional to load, and a detector 56 in the crossover line between IP and LP turbines 22 and 24 provides an indication of crossover pressure. A power detector 60 coupled to the generator output provides a megawatt (MW) signal indicative of output electrical power. An additional input utilized by the turbine control system is an indication of speed which is obtained by speed detection circuitry 62 and in the preferred embodiment of the present invention is operable to provide three redundant speed indicative signals.

In addition to controlling the valve actuation circuits for the throttle and governor valves, the turbine control system 50 is also operable to control the opening and closing of the stop valves and interceptor valves by respective valve actuation circuits 64 and 65. Selected input signals to the turbine control system 50 from the plant, as well as output signals to the plant, are coupled to field termination networks 68 so as to provide for signal conditioning and surge voltage protection.

Figure 2:
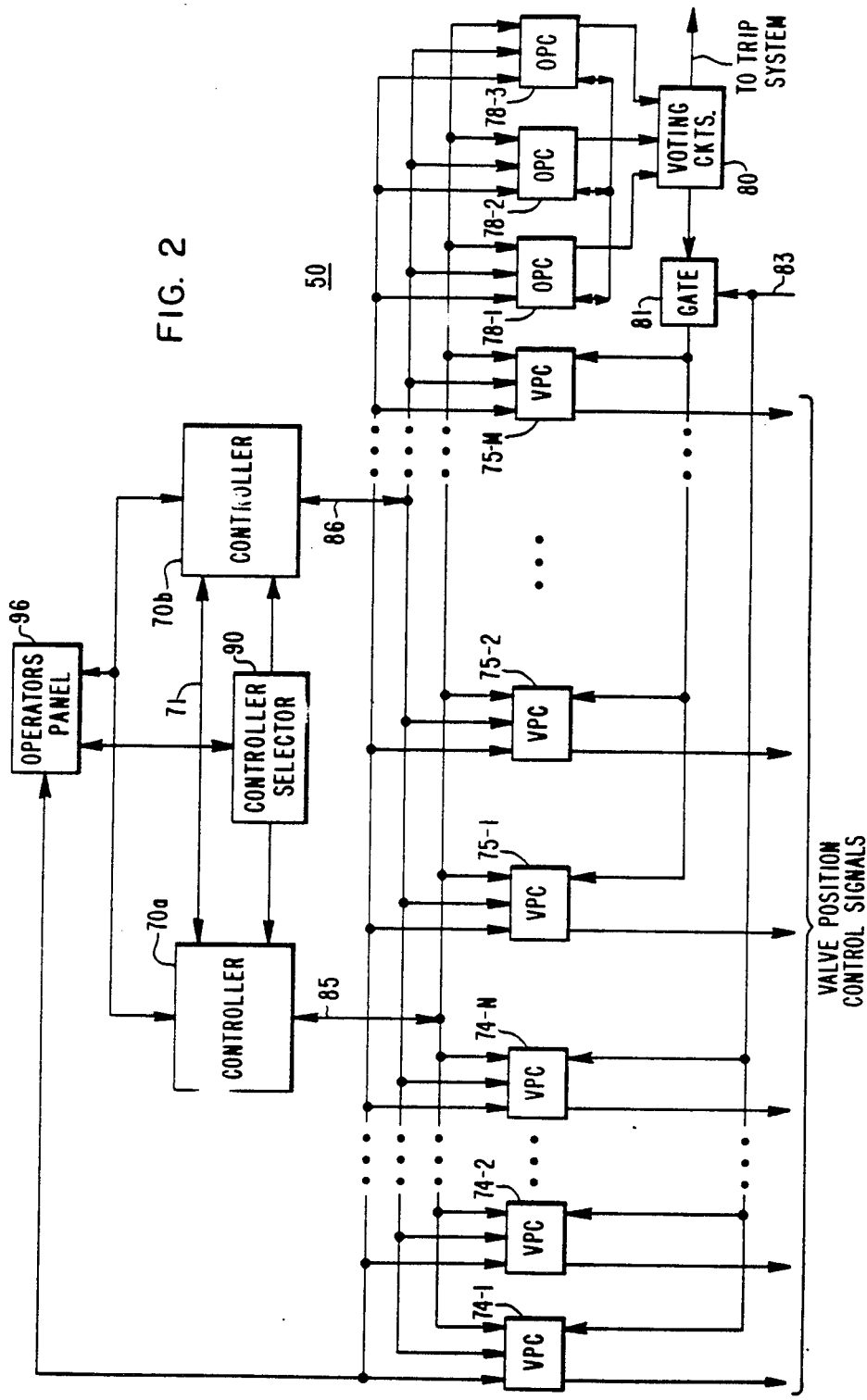
FIG. 2 is a block diagram of the turbine control system illustrated in FIG. 1.

A block diagram of a turbine control system 50 incorporating a preferred embodiment of the present invention is illustrated in FIG. 2. The system includes a controller 70a, having memory means for storing digital information including data and operating instructions. Digital processing circuitry is provided for processing the digital information and the controller includes means for inputting and outputting information. The reliability of the overall system may be improved by incorporating a second controller 70b having the identical structure as controller 70a and communicative with controller 70a by means of two-way link 71.

The system is divided into several interconnecting and coordinated functional modules with each functional module incorporating its own processing capability to execute its specific function. In FIG. 2, the functional modules include valve position control (VPC) circuits 74 and 75 for controlling respective throttle valve and governor valve actuation circuits. Thus valve position control circuits 74-1 through 74-N provide control signals to valve actuation circuits 44-1 through 44-N and constitute throttle valve position control circuits. Valve position control circuits 75-1 through 75-M control respective valve actuation circuits 45-1 through 45-M and constitute governor valve position control circuits. Although not illustrated, valve position control circuits could also be provided for the interceptor valves. Each valve position control circuit includes its own memory means for storing digital information including data and operating instructions as well as digital processing circuitry for processing the digital information, such function ideally being provided by a microcomputer.

In a preferred embodiment of the present invention, speed monitoring and overspeed protection is provided by three OPC circuits 78-1, 78-2 and 78-3, each including its own microcomputer for storing digital information including data and operating instructions as well as digital processing circuitry for processing the information. The OPC circuits are communicative with one another and are operable to interact directly with the governor valve position control circuits 75 through voting circuitry 80 and gate circuit 81 to initiate a closing of all of the governor valves upon a certain predetermined condition. Valve closing may also be effected by means of an external signal applied at lead 83, such signal being for example a turbine trip signal which is provided to gate 81 and to valve position control circuits 74-1 through 74-N.

By means of two-way digital data links 85 and 86, digital information may be conveyed from the valve position control and OPC circuits to both controllers 70a and 70b, whereas only one selected controller 70a or 70b may be selected to transmit digital information down to the valve position control and OPC circuits. A controller selector 90 is operable to determine which controller is the primary controller and which is the backup controller and may be further operable to selectively choose data link 85 or 86 for downward transmission of digital information.

The turbine control system additionally includes an operator's panel 96 in two-way communication with both controllers 70a and 70b as well as with all of the valve position control and OPC circuits. This latter connection enables various parameters to be communicated to the operator and allows the operator to place the system under direct manual control.

One basic function of an OPC circuit is to derive an indication of turbine speed and to initiate the closing of certain valves should that speed exceed a first predetermined value, such as 103% of the rated speed of the system, and to initiate a trip signal indicating that the complete system should be shutdown if the speed exceeds a second predetermined value, such as 110% of the rated speed.

Figure 3:
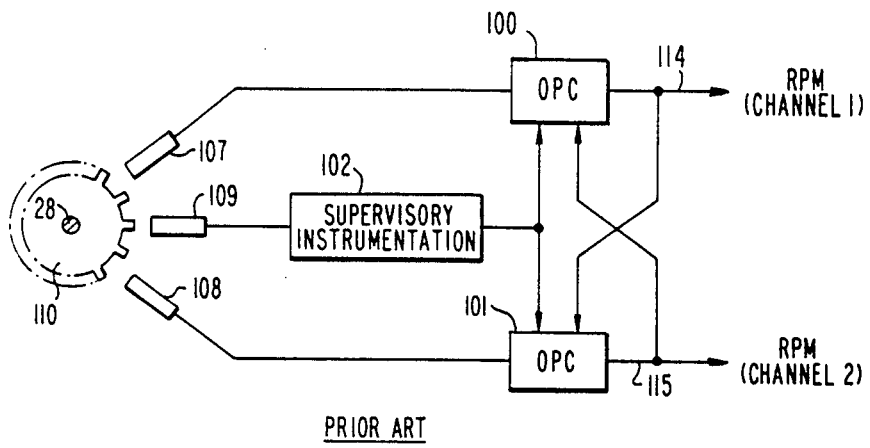
FIG. 3 is a block diagram of an OPC arrangement of the prior art.

FIG. 3 illustrates a prior art arrangement of the referenced patent for deriving redundant turbine speed signals utilizing two OPCs, 100 and 101, as well as a supervisory instrumentation processing circuit 102 which derives an analog signal indicative of turbine speed. A plurality of speed transducers 107, 108 and 109 are in proximity to a notched wheel 110 attached to turbine shaft 28 so as to provide respective generally sinusoidal output signals in response to rotational movement of the wheel whereby the frequency of the waveform is proportional to turbine speed. The speed indicative signals generated by speed transducers 107–109 are respectively provided to OPC circuits 100, 101 and supervisory instrumentation processing circuitry 102. In response to the output signals from transducers 107 and 108, OPCs 100 and 101 will derive a signal, RPM, indicative of turbine speed. An output analog RPM signal is provided by OPC 100 on line 114 and constitutes a channel 1 RPM output signal whereas OPC 101 provides an analog RPM signal on line 115 and constitutes a channel 2 RPM output signal. These signals are provided to appropriate readouts for the operator, with each additionally being provided to the other OPC of the pair. The supervisory instrumentation processing circuit 102 provides a second analog signal to both of the OPCs indicative of speed, each of which then compares its own derived RPM signal with the other two RPM signals to see if it is within a predetermined range of them. If its RPM signal is within such range, the signal is validated for transmission to the controller 70a or 70b via the data links 85 and 86 (FIG. 2) when so requested.

Figure 4:
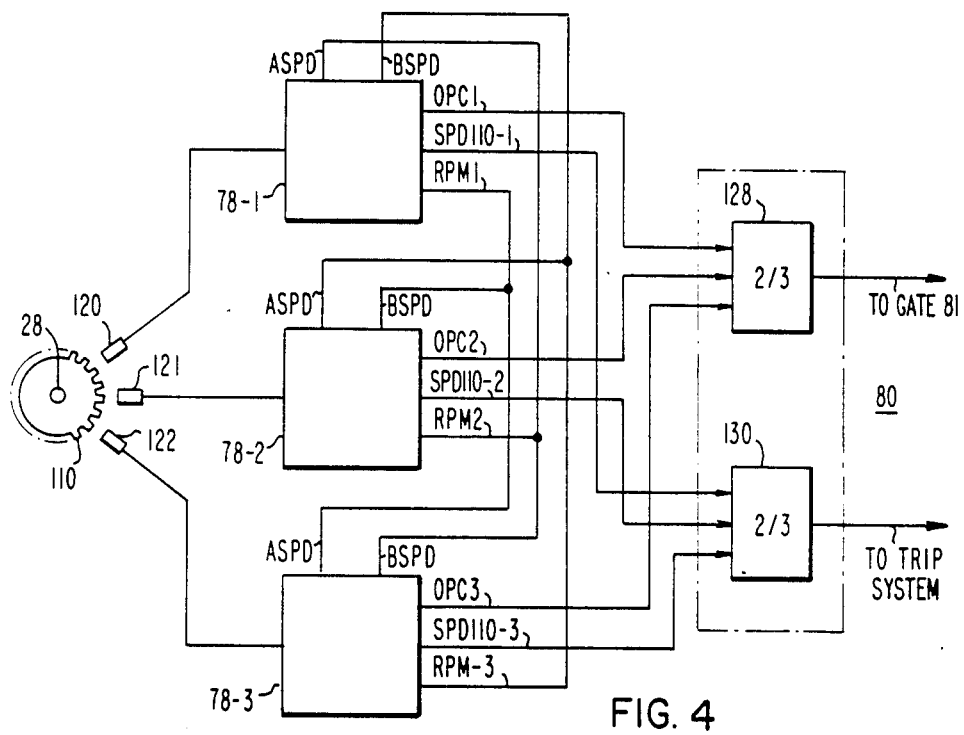
FIG. 4 is a block diagram illustrating an embodiment of the OPC arrangement of the present invention.

In the present invention, and as illustrated in FIG. 4, the supervisory instrumentation processing circuitry has been eliminated and three identical OPC circuits, 78-1, 78-2 and 78-3 are utilized for deriving the RPM signals. Each OPC circuit receives a speed indicative signal from a respective speed transducer 120, 121 and 122 to derive, in a manner to be described, an extremely precise RPM signal. In addition, each OPC circuit receives two auxiliary speed signals designated ASPD and BSPD constituting the RPM output signals from the other two OPCs, as illustrated by the RPM 1, RPM 2 and RPM 3 connections of FIG. 4. The ASPD and BSPD signals are utilized for comparison purposes in order to validate the RPM signal prior to its being communicated to the controller via the digital data link.

Each OPC circuit is operable to provide a respective output signal OPC 1, OPC 2 and OPC 3 indicative of an overspeed situation wherein the measured speed attains 103% of rated speed. This signal is either a digital one or a digital zero and the outputs are provided to a two-out-of-three voting circuit 128 operable to provide a digital one output signal if two or more of its inputs are digital ones so as to effect closure of the governor valves via gate 81 (FIG. 2). The triple redundancy and two-out-of-three voting circuit provide for a higher level of reliability in that an erroneous OPC output signal will not cause an unnecessary closure of the governor valves.

Another output provided by the OPC circuits is a respective SPD 110-1, SPD 110-2 and SPD 110-3 output indicative of the calculated speed attaining 110% of rated speed, signifying a trip situation. A two-out-of-three voting circuit 130 connected to receive the SPD 110 signals will provide a digital one output signal if two or more of its inputs are digital ones, such output signal being available for connection into an alarm or operator's trip system.

Figure 5:
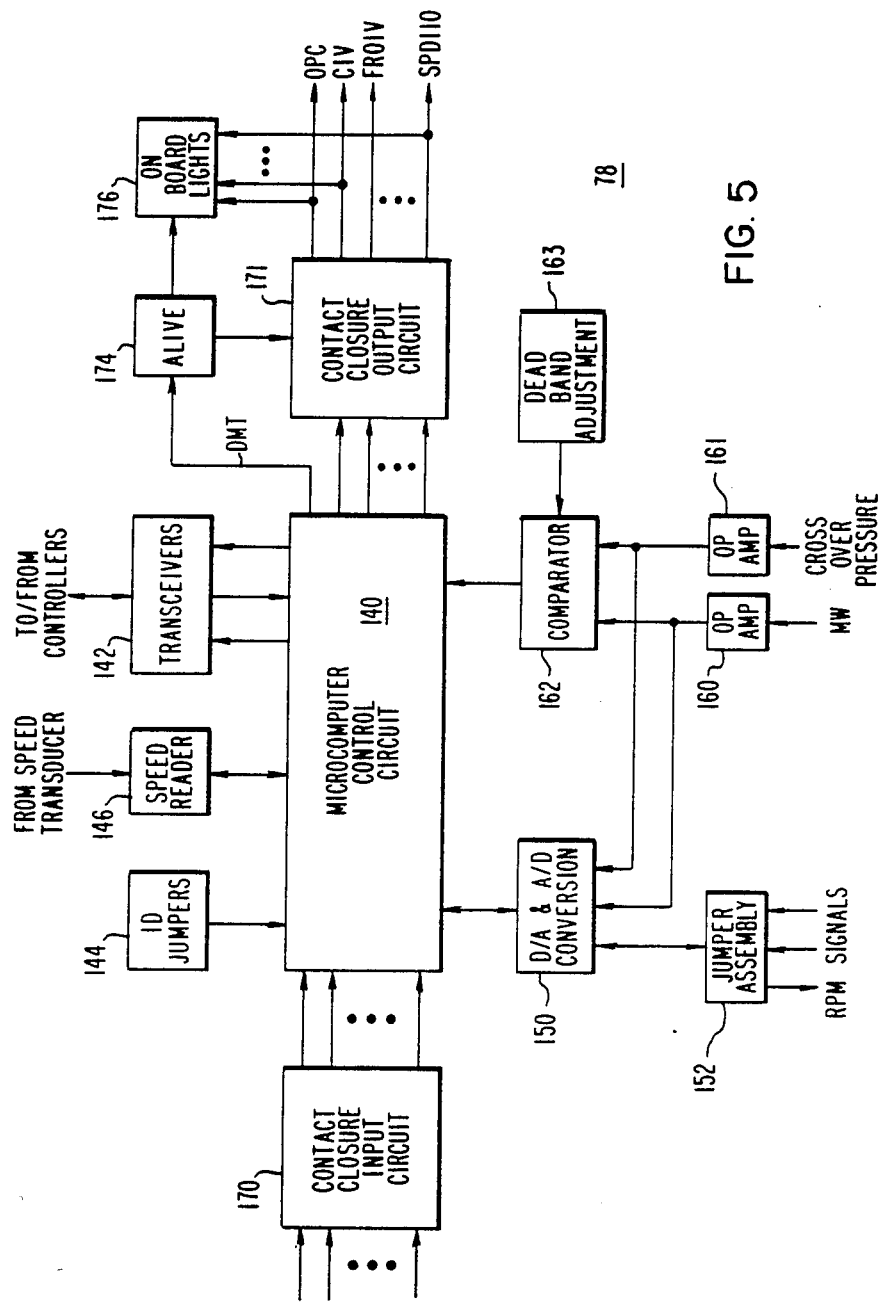
FIG. 5 is a block diagram of a typical OPC circuit.

A typical OPC circuit designated by the general numeral 78 is illustrated in FIG. 5. Many of the components are identical or similar to the OPC circuit described in the referenced patent. Basically, the OPC includes a control means preferably in the form of a microcomputer control circuit 140 having its own memory means for storing data and operating instructions as well as processing means for carrying out the instructions. A transceiver arrangement 142 is provided for digital information transfer between the OPC and controllers 70a and 70b via the digital data links. The primary controller may selectively communicate with one of the OPCs by transmitting a particular OPC address of identification prior to the command. Although received by all OPCs as well as by all valve position control circuits, only the OPC selectively addressed will accept the command, such address or identification being previously designated by means of an identification jumper assembly 144 by which an operator designates which of three identical printed circuit boards will be OPC 78-1 or 78-2 or 78-3.

Speed reader 146 is responsive to an output signal from a speed transducer to provide a speed indicative count to microcomputer control circuit 140 which, in response thereto, derives an extremely precise RPM signal having a resolution measurable in tenths of an RPM, representing a significant improvement over previous systems.

The derived RPM signal in digital form is converted to analog form by appropriate digital-to-analog converter circuitry in the D/A and A/D conversion circuits 150 and thereafter provided, via jumper assembly 152 as an RPM signal to the other two OPCs as well as to appropriate operator-viewed readouts. Jumper assembly 152 also receives the RPM signals from the other two OPCs to constitute ASPD and BSPD signals which are converted to digital form by conversion circuitry 150 and thereafter used by the microcomputer control circuit 140 for comparison and validation of its own derived RPM value.

The OPC circuit is further operable to provide fast valving functions. Basically, if the turbine load exceeds the generator output by a preset value, and if there are no transducer failures, the interceptor valves are closed and reopened after a certain time delay. This action is called fast valving, a technique that reduces turbine input power rapidly following recognition of a fault condition.

In its fast valving function, the OPC circuit receives an MW signal from the power detector 60 as well as a crossover pressure signal from transducer 56 (FIG. 1). These signals are respectively amplified and conditioned by operational amplifiers 160 and 161, the output signals of which are provided to a comparator circuit 162. If the conditioned MW and crossover pressure signals differ by some predetermined amount as determined by the dead band adjustment 163, then comparator 162 will provide an output signal to the microcomputer control circuit 140 indicating that a fast valving action should be initiated.

The conditioned MW and crossover pressure signals from OP AMP's 160 and 161 are provided to conversion circuitry 150 where they are converted into a digital format for use by the microcomputer control circuit 140. The MW signal after placement into a storage location is read out therefrom for transmission to the controllers 70a and 70b through the transceiver arrangement 142.

Contact closure input circuit 170 is operable to input to the microcomputer control circuit 140 a plurality of externally generated signals such as for testing the OPC, externally initiating or inhibiting fast valving, as well as other functions such as described in the referenced patent.

Contact closure output circuit 171 is operable to output a number of signals resulting from operation of the microcomputer control circuit, such signals including the OPC signal and SPD 110 signal previously described. Contact closure output circuit 171 may also be operable to output a signal CIV to close the interceptor valve for fast valving operation as well as a signal FROIV to quickly reopen the interceptor valve.

In the event of a failure of the microcomputer control circuit 140, the apparatus is operable to prevent the contact closure output circuit from providing any output signal, this operation being accomplished with the provision of alive circuit 174, which is periodically triggered by a deadman timer (DMT) signal from the microcomputer control circuit 140. A plurality of lights 176 may be provided directly on the printed circuit board constituting the OPC in order to indicate the presence of any output signal from contact closure output circuit 171, as well as to indicate any failure of the microcomputer control circuit 140.

Figure 6A:
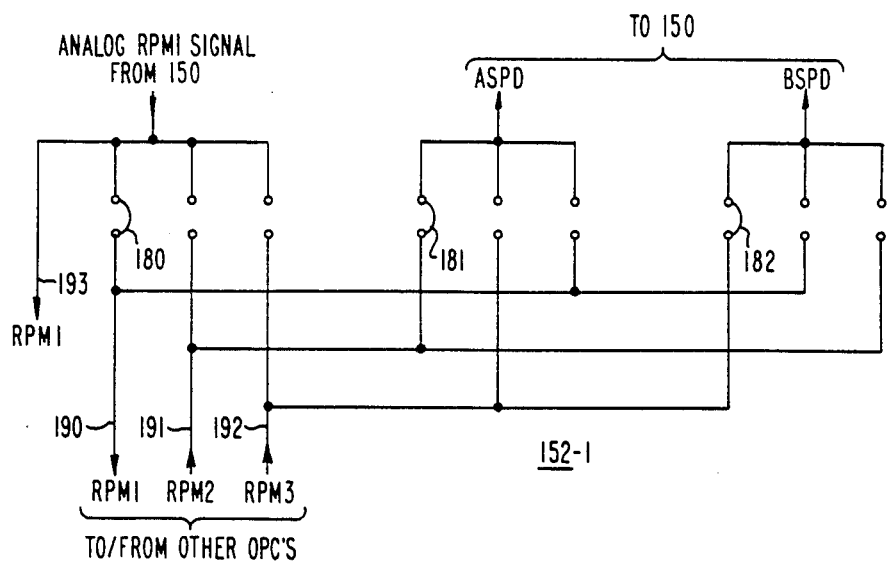
FIGS. 6A-6C illustrate the jumper assembly of FIG. 5 in more detail.
Figure 6B:
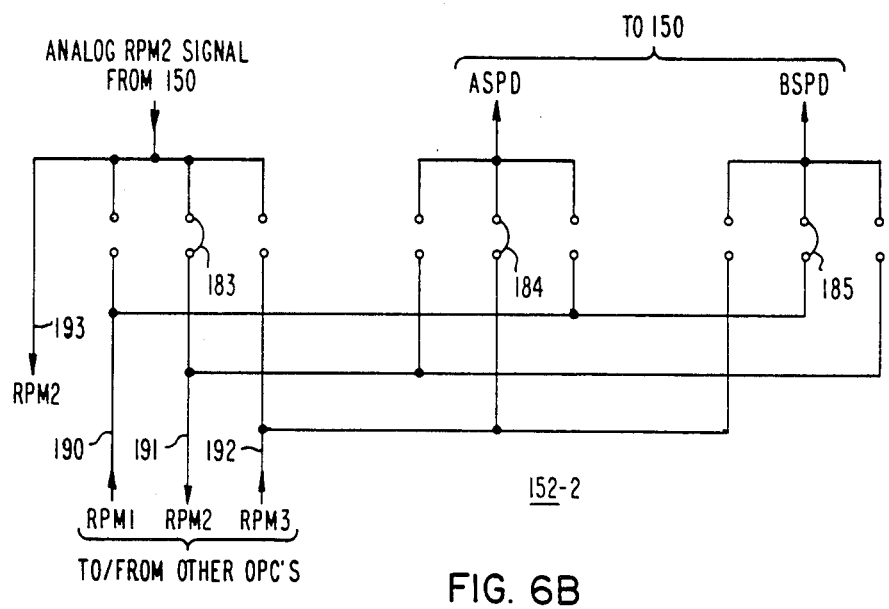
Figure 6C:
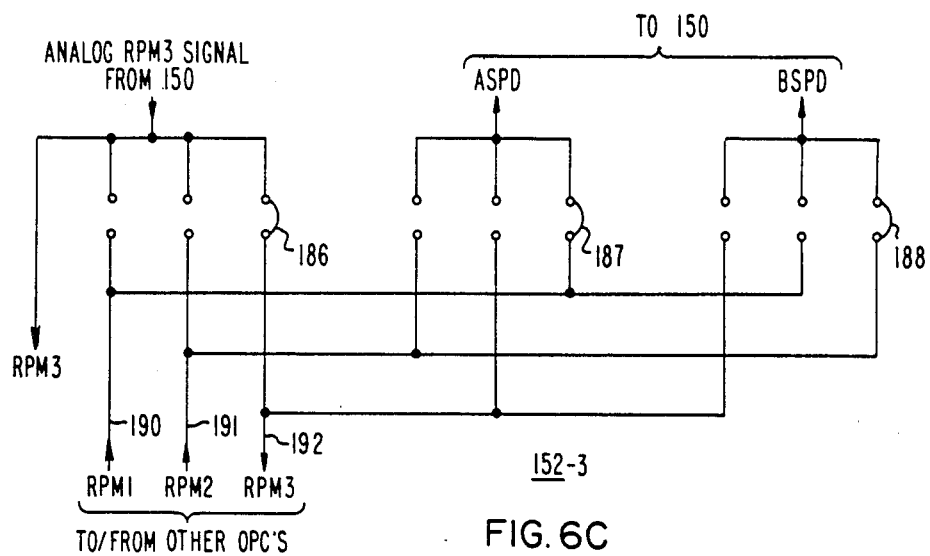

FIGS. 6A-6C illustrate the jumper assembly 152 for OPC circuit 78-1, 78-2 and 78-3, respectively. Jumpers 180-188 are physically placed into position prior to operation so as to define certain signal paths. More particularly, the microcomputer control circuit of OPC 78-1 generates an RPM 1 signal which is converted to analog form. Jumper 180 in FIG. 6A provides this RPM 1 signal on lead 190. RPM 2 from the second OPC appears on line 191 and is defined as the ASPD signal by means of jumper 181 while RPM 3 from the third OPC appears on line 192 and is defined as the BSPD signal by means of jumper 182. The RPM 1 signal also appears on line 193 for driving an operator display.

In FIG. 6B, illustrating the jumper assembly for the second OPC, the analog RPM 2 signal appears as an output on line 191 by virtue of jumper 183. RPM 3 on line 192 is defined as the ASPD signal by jumper 184 and RPM 1 on line 190 is defined as the BSPD signal by means of jumper 185.

As illustrated in FIG. 6C, RPM 3 from the third OPC appears on line 192 by virtue of jumper 186 and RPM 1 on line 190 is defined as the ASPD signal by jumper 187 and RPM 2 on line 191 as the BSPD signal by jumper 188.

The ASPD and BSPD auxiliary speed signals are converted to digital form and the microcomputer control circuit of each OPC compares all three signals and validates its own derived RPM signal if it is within predetermined limits of the auxiliary speed signals. Validated RPM signals are thereafter transmitted to the controllers and the primary controller selects one of the transmitted RPM signals for control purposes. It is therefore imperative that the RPM derived signals be as precise as possible so that accurate control operation may be achieved. Assisting in the derivation of this RPM signal is the improved speed reader 146 illustrated in more detail in FIG. 7 to which reference is now made.

Figure 8:
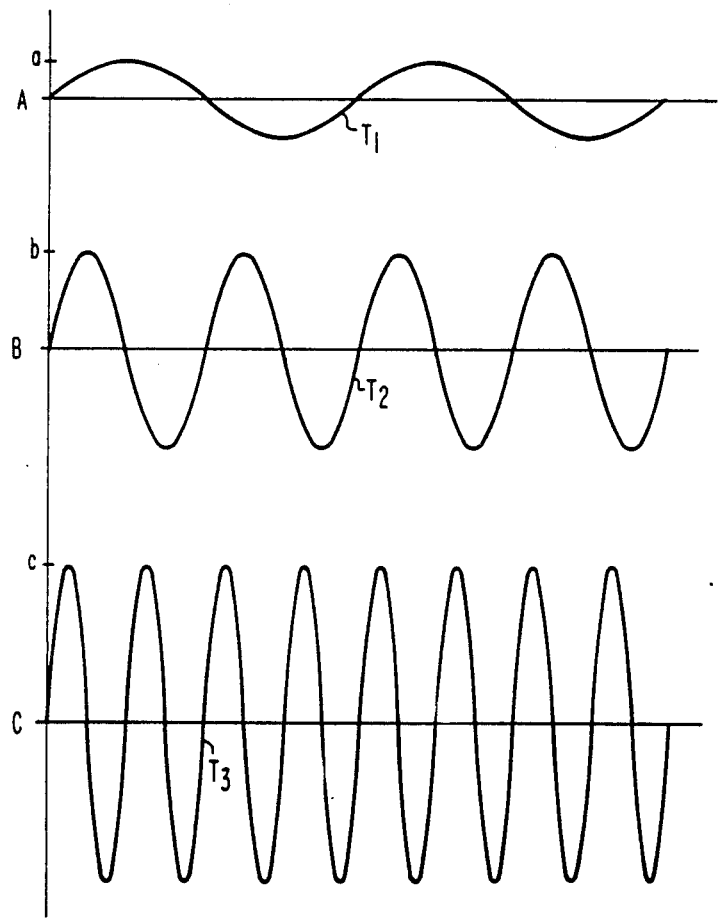
FIG. 8 illustrates the output of the speed transducer for three different speeds.

The output of a speed transducer is provided to a low pass filter and voltage clamp network 200 which operates to filter out any high frequency signal and to limit the maximum excursion of the speed transducer output which varies in frequency and amplitude as a function of turbine speed. For example, in FIG. 8, waveforms A, B and C illustrate a typical speed transducer output for relatively low, medium and high turbine speeds. Waveform 8C demonstrates the highest frequency with an amplitude that has been clamped.

Referring once again to FIG. 7, a differential comparator 202 is provided and is responsive to the output of the low-pass filter and voltage clamp network 200 to generate a square wave output signal which is uniform in amplitude but with a frequency which is proportional to turbine speed. This square wave output is provided to a zero crossing detector 204 which operates as a multiplier circuit to deliver an output signal which is double the frequency of the input signal and precisely synchronized with a clock pulse of frequency f/2 on line 205. This latter signal is derived from a stable clocking pulse of frequency f generated by the microcomputer control circuit and provided on line 206 to divider circuitry 208.

The multiplier circuit 204 includes a first flip-flop 214 which synchronizes the differential comparator output with the clock pulse on line 205 after inversion by NOT circuit 216. A second flip-flop 218 transfers its input from flip-flop 214 to its output upon the occurrence of a clock pulse on line 205, with the outputs of both flip-flops being provided to an exclusive OR circuit 220, the output pulse waveform of which is provided to a pulse accumulator 222 feeding into a latch circuit 224.

Although a counter can be utilized for counting the pulses from zero crossing detector 204, a pulse accumulator is preferred so as to eliminate the complicated synchronizing and reset logic which would be required for a counter. The pulse accumulator repetitively counts up the pulses and automatically rolls over when a maximum is reached. For example, an 8-bit accumulator will count to 256 and then automatically repeat. The particular count in accumulator 222 is strobed into latch circuit 224 upon the occurrence of a strobe pulse on line 226 from synchronizer 228.

The strobe pulse is a sampling pulse generated by synchronizer 228 in response to two input signals, one being the clocking pulse of frequency f inverted by NOT circuit 230 and the other being the clocking pulse divided down by a factor of a.

The nominal rotational speed of the turbine, in RPM, results in a corresponding pulse count accumulation of 2× RPM pulses per second. For example, if the rotational speed is 1 RPM then the accumulated pulse count will be 2 pps. If the rotational speed is 3600 RPM then the accumulated pulse count wil be 7200 pps. With the discrete sampling of the pulse count accumulation, at a certain sampling rate, there is the possibility of an aliasing effect which produces beat frequencies about the sampling frequency and its harmonics and which may lead to erratic readings. If BF is the beat frequency then:

$$BF = |PF - (S \times N)| \qquad (1)$$

where PF is the pulse count accumulation frequency, S is the sampling frequency and N an integer such that $$0 \leq BF \leq (S/2)$$

Accordingly, one consideration in the selection of the sampling frequency S is that it should be relatively high so that the numbers of its harmonics that may be encountered in the complete speed range of the turbine are minimized. The sampling rate must be high enough so that two successive samplings occur within the maximum count of the accumulator, however, the rate must reflect the capabilities of the computer to process the data obtained between samplings.

In one embodiment of the invention it is preferable that the same sampling rate be applicable for different rated speeds associated with different turbine systems. For example, typical rated speeds for European systems are 1500 RPM for nuclear, 3000 RPM for fossil-fired, and 6000 RPM for boiler feedpump turbines. Typical U.S. ratings are 1800 RPM for nuclear, 3600 RPM for fossil-fired and 7200 RPM for boiler feedpump turbines.

With all of these considerations in mind a sampling frequency of 640 Hz may be utilized. The harmonics of 640 Hz are as follows:

| N | HARMONIC OF 640 Hz SAMPLING FREQUENCY | N | HARMONIC OF 640 Hz SAMPLING FREQUENCY |
|---|---|---|---|
| 0 | 0 | 13 | 8320 |
| 1 | 640 | 14 | 8960 |
| 2 | 1280 | 15 | 9600 |
| 3 | 1920 | 16 | 10240 |
| 4 | 2560 | 17 | 10880 |
| 5 | 3200 | 18 | 11520 |
| 6 | 3840 | 19 | 12160 |
| 7 | 4480 | 20 | 12800 |
| 8 | 5210 | 21 | 13440 |
| 9 | 5760 | 22 | 14080 |
| 10 | 6400 | 23 | 14720 |
| 11 | 7040 | 24 | 15360 |
| 12 | 7680 | 25 | 16000 |

The following chart illustrates in Column 1 the above-enumerated rated turbine speeds and the resulting pulse count frequency in Column 2. Column 3 sets forth the nearest lower harmonic of 640 Hz relative to the particular pulse count frequency, and Column 4 illustrates the deviation or how far away the pulse count is from the harmonic. The fifth column sets forth the nearest higher harmonic relative to the pulse count, and the last column sets forth its deviation.

| RATED SPEED (RPM) (1) | RESULTING PULSE COUNT FREQUENCY PF (PPS) (2) | NEAREST LOWER HARMONIC (3) | DEVIATION (4) | NEAREST HIGHER HARMONIC (5) | DEVIATION (6) |
|---|---|---|---|---|---|
| 1500 | 3000 | 2560 | 14.7% | 3200 | 6.7% |
| 1800 | 3600 | 3200 | 11.1% | 3840 | 6.7% |
| 3000 | 6000 | 5760 | 4.0% | 6400 | 6.7% |
| 3600 | 7200 | 7040 | 2.2% | 7680 | 6.7% |
| 6000 | 12000 | 11520 | 4.0% | 12160 | 1.3% |
| 7200 | 14400 | 14080 | 2.2% | 14720 | 2.2% |

It is seen that for the selected 640 Hz sampling frequency none of the rate speeds generates a pulse count which is equal to any of the harmonics of the sampling frequency. The closest value of concern is the 6000 RPM rated speed of a boiler feedpump turbine (1.3% deviation), however the 6000 RPM value is valid only when the main turbine is operating at 100% load.

Although it is desirable to utilize the same sampling rate for all types of turbine systems so that all OPC boards can be identical in their manufacture, it is understood that, if desired, different divider circuitry 208 may be provided so as to yield different sampling rates for different applications.

Figure 9:
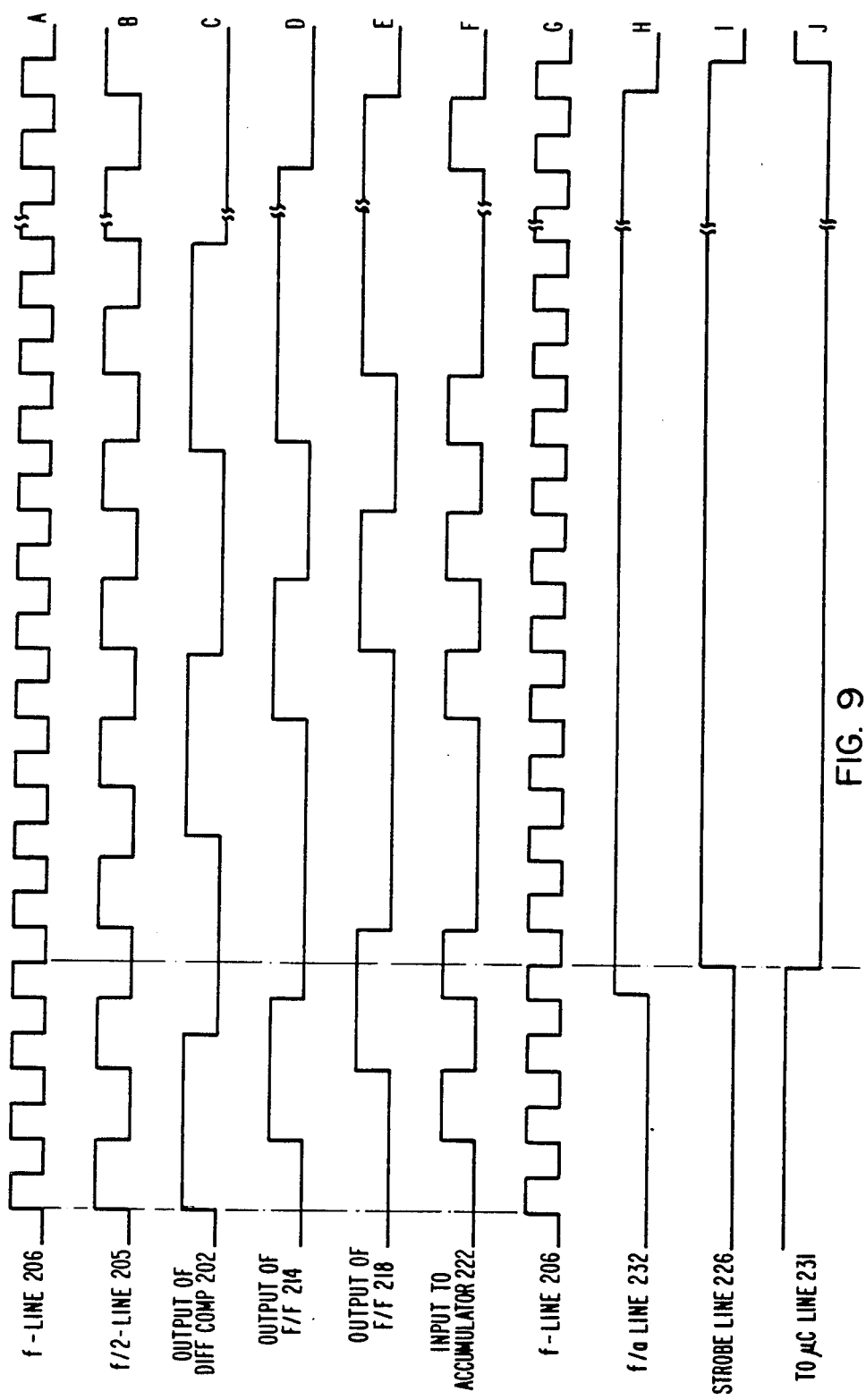
FIG. 9 presents waveforms illustrating the operation of the speed reader of FIG. 7.

Operation of the speed reader 146 will be described with additional reference to waveforms A–J of FIG. 9 illustrating the waveforms at various locations in the circuitry of FIG. 7. The pulse waveform of frequency f on line 206 is illustrated as the waveform of FIG. 9A and FIG. 9B illustrates a waveform of half this frequency, that is, the clocking pulse appearing on line 205. By way of example, for the sampling frequency of 640 Hz and a =160, a stable oscillator would be provided having a frequency f of 102.4 kHz making the clocking frequency on line 205 51.2 kHz with a period of microseconds.

The output of the differential comparator 202 is illustrated as the waveform of FIG. 9C wherein the width of the pulses provide an indication of turbine speed. The minimum width of a differential comparator output pulse is equivalent to the period of the waveform of FIG. 9B (19.53 microseconds) and indicative of maximum measurable speed. FIG. 9C illustrates the pulses as becoming wider and further apart indicative of a slowing down of speed, by way of example.

The speed signal of FIG. 9C is fed into flip-flop 214 which is triggered by a positive-going input clocking pulse which, in view of NOT circuit 216, is equivalent to a negative-going clocking pulse on line 205. Accordingly, the first illustrated pulse of FIG. 9D is the result of the negative-going pulse of FIG. 9B which transfers the digital one (FIG. 9C) at its input to its output. The output of flip-flop 214 will remain a digital one until the negative-going portion of the next pulse of FIG. 9B causes a switching to a digital zero state. Subsequent pulses of FIG. 9D are generated in a similar manner.

The output of flip-flop 218 is illustrated in FIG. 9E and is merely the waveform of FIG. 9D delayed by the equivalent of the width of a single pulse of the waveform of FIG. 9B.

The exclusive OR circuit 220 will provide a digital one output signal when one and only one of its input signals is also a digital one. Accordingly, the waveform of FIG. 9F is the result of the exclusive OR process on the waveforms of FIGS. 9D and 9E and constitutes the pulses to be counted by accumulator 222 which is thereafter periodically sampled to obtain a count indication for derivation of precise turbine speed.

The signal transfer and sampling is all under control of an extremely precise clocking pulse signal and at a precise time when the accumulator is not in a transition the count is transferred to latch 224 for delivery to the microcomputer control circuit. The master clocking pulse waveform of FIG. 9A is repeated in FIG. 9G to better illustrate the timing relationships with FIGS. 9H-9J to demonstrate the transfer of the count to the microcomputer.

For the example given, the divider circuitry divides the master clock pulse signal down by a factor of 160 (a=160), resulting in a 640 Hz signal on line 234 depicted in waveform 9H. When this waveform is a digital one, a strobe output signal on line 226 will be provided, as indicated in FIG. 9I, when the clocking pulse of FIG. 9G goes from a digital one to a digital zero. The waveform of FIG. 9I therefore is the strobe pulse which causes latch circuit 224 to sample and hold the then present count of accumulator 222 until the next strobe pulse 1.56 ms later. When the strobe pulse is generated, a complementary signal on line 231, as indicated in waveform 9J, is provided to the microcomputer control circuit indicating that the particular count is ready for transfer, and in response thereto results in the issuance of a signal on line 238 causing the sampled count in latch 224 to be transferred, whereafter the process repeats for each generated strobe pulse.

The microcomputer control circuit is operable to compute the difference between the present and previous readings to obtain an indication of how many pulses have occurred between samplings. With this information, an accurate representation of speed (RPM) may then be derived, the process being illustrated in FIGS. 10 to 14.

Figure 7:
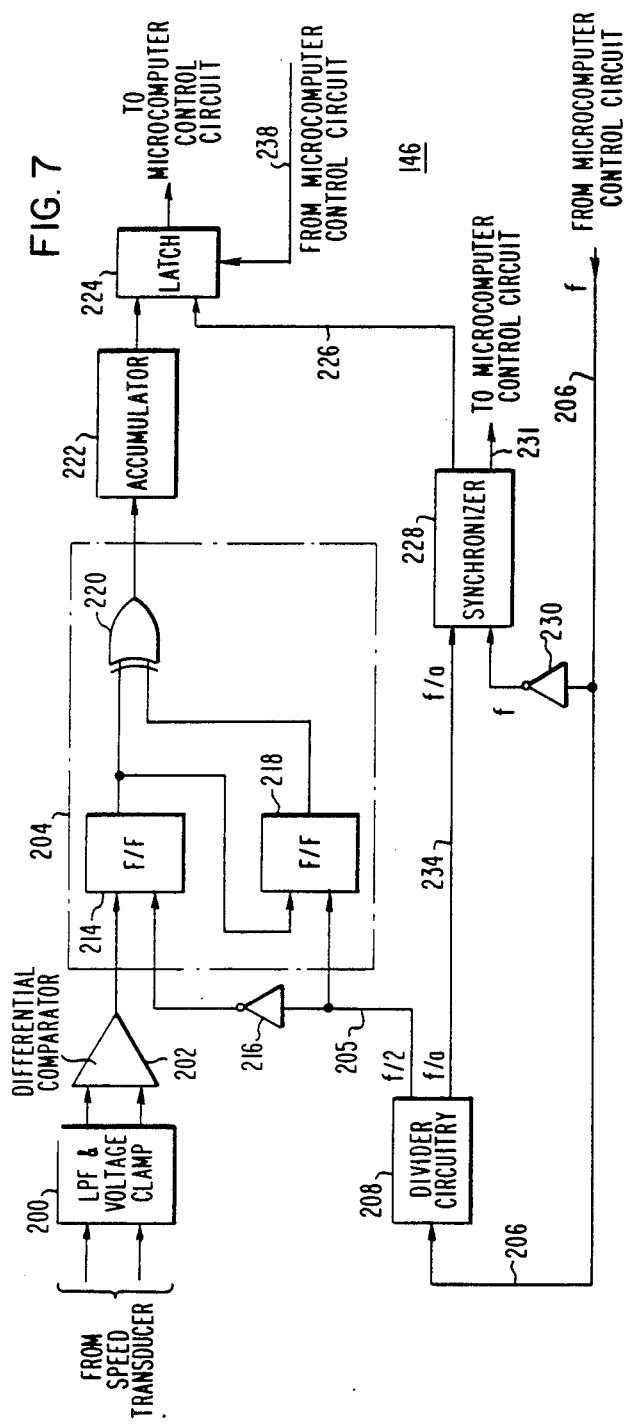
FIG. 7 is a block diagram illustrating the speed reader of FIG. 5 in more detail.
Figure 10:
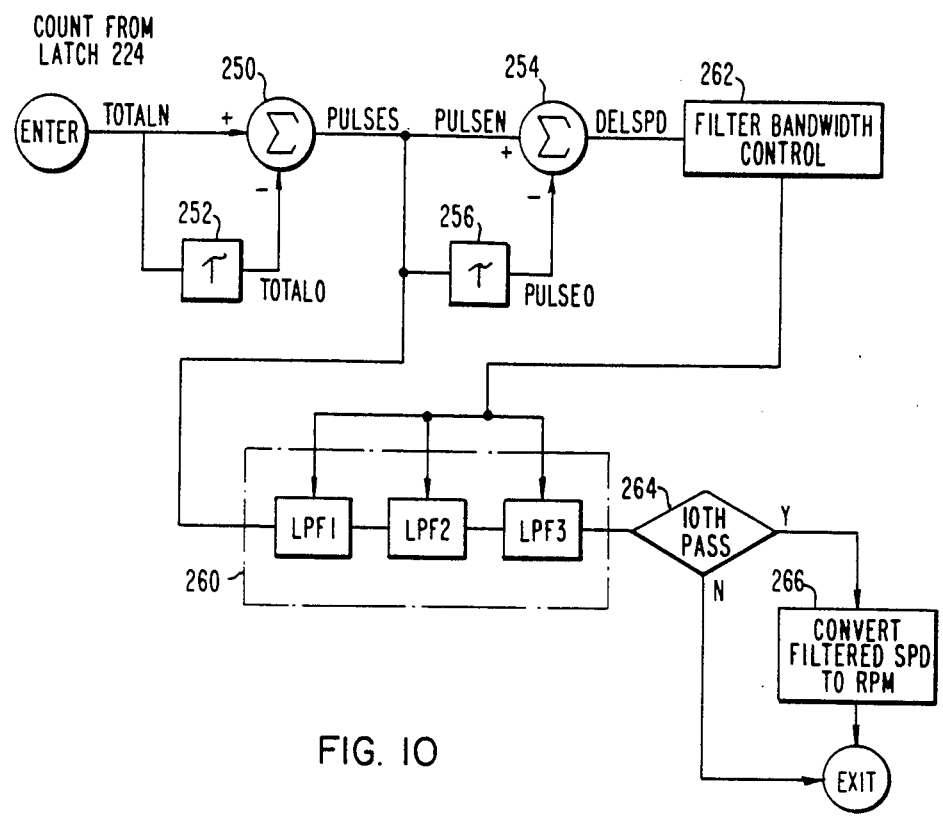
FIG. 10 is a flow chart illustrating the derivation of an RPM speed signal.

FIG. 10 descriptively illustrates the microcomputer processing of the accumulated pulses as provided by the latch circuit 224 of FIG. 7. The operation of FIG. 10 is such as to obtain a difference in the number of pulses accumulated between samplings, which in the present example is every 1/640 seconds. The present total number of pulses counted is designated TOTALN which is provided to summer 250 as is the previous total, TOTALO. With the presence of delay circuit 252 having a delay time equal to the period of the sampling frequency, each TOTALN becomes the TOTALO for the next iteration.

The difference between the new and old readings indicates the number of pulses accumulated in one sample period and is designated PULSES. This latter output is provided as a new pulse input PULSEN to a summer 254 which also receives the old pulse count PULSEO from one period delay 256 to provide an output indicative of the difference between the present number of pulses accumulated and the previous number accumulated with the output being designated DELSPD. A changing DELSPD indicates whether or not the pulse count is changing which in turn is indicative of an accelerating or decelerating condition of the turbine.

In the turbine speed range from startup to rated speed there are certain speeds which produce pulse counts which, in conjunction with the sampling frequency, result in low beat frequencies, the values of which may be determined by equation 1. The beat frequencies of pulsations may cause erroneous output readings and accordingly may be filtered out by use of a narrow band filter. Although the narrow band filter results in a smooth readout, its response is relatively slow such that the measured and displayed speed would objectionably lag behind the true speed. Use of a constant narrow band filter at all turbine speeds including the rated speed therefore would degrade the dynamic behavior of any control loop in which the speed measurement is utilized.

When the turbine is accelerating or decelerating it would be desired to have a relatively wide bandwidth which yields a faster response and more closely follows actual speed (although allowing somewhat more noise to pass through the filter). With the present invention, filter means are provided which adapts itself to the particular speed or acceleration situation to provide a narrow bandwidth filtering action when required and to provide a wider bandwidth filtering action when required.

The adaptive filter 260 which receives the output of summer 250, the output being indicative of the number of pulses between samplings, includes three identical low pass filter stages LPF1-LPF3, with the bandwidth of each being regulated by a filter bandwidth control 262 operable to select one of a plurality of bandwidths in response to the DELSPD signal, as will be explained.

After the filtering operation has been performed ten times, as indicated by decision block 264, the value obtained is appropriately scaled and normalized as indicated at 266, in accordance with the rated turbine system under control, to thereby derive the required RPM speed signal.

Figure 11:
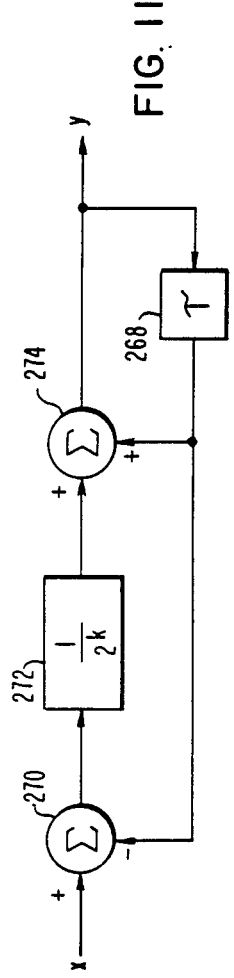
FIG. 11 illustrates a typical low-pass filter of FIG. 10.

A typical filter stage LPF1, LPF2 or LPF3 is illustrated in FIG. 11 wherein x represents the input signal and y indicates the output signal. With delay 268 equal to one sampling period, the previous output is subtracted from the present input in summer 270 with the result being diminished by a factor of $\frac{1}{2}^K$ as indicated at 272. The result is then added, in summer 274 to the previous output to constitute the present output. Mathematically stated:

$$y(nT)=y([n"1]T)+\tfrac{1}{2}^K(x(nT)-y([n=1]T))$$

where n designates a present value, [n−1] the previous value, T the period, and $\tfrac{1}{2}^K$ a bandwidth factor determined by control 262. In the present invention, the bandwidth factor $\tfrac{1}{2}^K$ is represented as $2^{S-8}$ where S varies from zero to 3 as a function of the change in speed, DELSPD, and a number of iterations performed. Thus, when:

| | |
|---|---|
| S = 0 | $\tfrac{1}{2}^K = 2^{0-8} = \tfrac{1}{2}^8 = 1/256$ |
| S = 1 | $\tfrac{1}{2}^K = 2^{1-8} = \tfrac{1}{2}^7 = 1/128$ |
| S = 2 | $\tfrac{1}{2}^K = 2^{2-8} = \tfrac{1}{2}^6 = 1/64$ |
| S = 3 | $\tfrac{1}{2}^K = 2^{3-8} = \tfrac{1}{2}^5 = 1/32$ |

Figure 12:
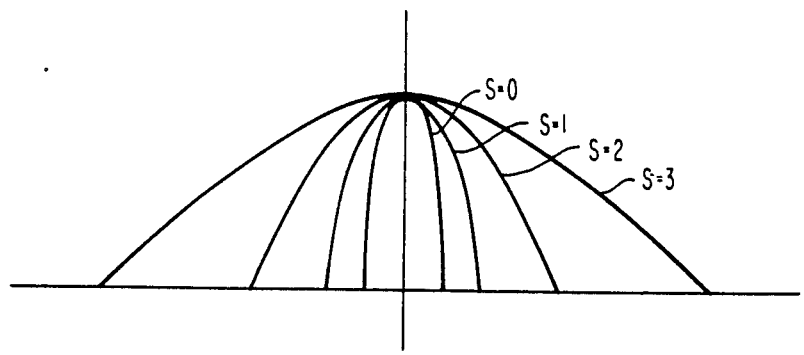
FIG. 12 illustrates the adaptive bandwidth of the low-pass filter arrangement of FIG. 10.

The bandwidth factor relates to the bandwidth or cutoff frequency of the filter. If S is low (S=0), the effect of an input change is reduced in each filter section by a factor of 256 indicative of a relatively narrow bandwidth whereas if S is high (S=2 or 3), the effect is only reduced by a factor of 64 or 32, indicative of a relatively wider bandwidth. The curves of FIG. 12 illustrate frequency response curves for the filter showing its adaptive bandwidth when S=0, 1, 2 and 3. By way of example, the bandwidths are 0.4 Hz when S=0, 0.8 Hz when S=1, 1.6 Hz when S=2 and 3.24 Hz when S=3, when a 640 Hz sampling frequency is utilized.

Figure 13:
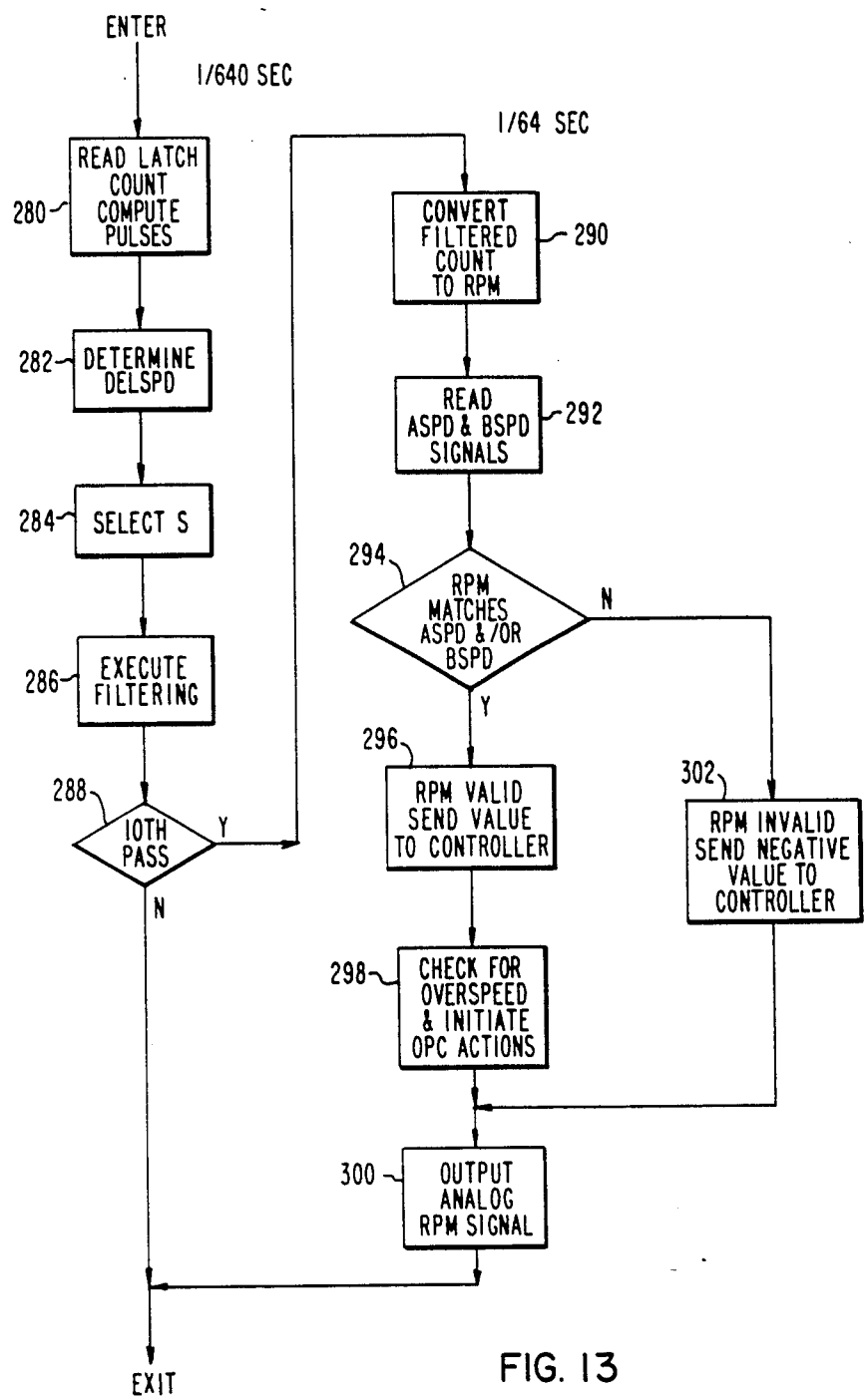
FIG. 13 is a program flow chart illustrating operation of the present invention.

FIG. 13 is a program flow chart illustrating the obtaining of an RPM signal as in FIG. 10 and its subsequent validation by comparison with the RPM signals derived in the other two OPCs. With additional reference to FIG. 10, the accumulated pulses relating to the turbine speed are input to the computer from the latch circuit 224 of FIG. 7, for computational purposes. As indicated at block 280, the difference between two successive readings is calculated to derive PULSES. For some speeds, such as around a harmonic of the scanning frequency, the value of PULSES will change little, if at all, in the 640 scans made in each second. Under such circumstances, the value of DELSPD will change very little, if at all. These running speeds result in extremely low beat frequencies and accordingly very high beat periods where, for the particular example given Beat Frequency = 640/Beat Period Beat Period = 640/Beat Frequency At the other extreme, for very high beat frequencies, the beat period is low and DELSPD will change on every scan. This determination of DELSPD is accomplished at block 282 and is utilized to control the bandwidth of adaptive filter 260. For these speeds which result in very high beat frequencies, and accordingly low beat periods, the adaptive filter will have a wide bandwidth, whereas for those speeds resulting in a low beat frequency, and accordingly a high beat period, the adaptive filter will have a very narrow bandwidth.

The bandwidth is selected, by block 284, by choosing a value of S equal to 0, 1, 2 or 3 in accordance with the DELSPD determination of block 282, as will be subsequently explained.

Once the bandwidth has been established, the filtering of the PULSES signal at the input to adaptive filter 260 is accomplished as indicated by block 286. After 10 scans, as indicated by decision block 288, the filtered signal is appropriately scaled, normalized and converted to an RPM signal as indicated at block 290. These latter two blocks correspond to blocks 264 and 266 of FIG. 10. For the scanning frequency of 640 Hz, the conversion in block 290 is done every 1/64th of a second, the arrangement providing for a somewhat smoother filter output and allowing time for the conversion computation.

Once having the calculated RPM value, it must be validated by comparison with the RPM signals from the other two OPCs, such signals being designated as the ASPD and BSPD signals which are read into the microcomputer of the OPC by operation of block 292.

If the calculated RPM signal for this OPC matches one or more of the calculated signals from the other two OPCs, as indicated by decision block 294, then a validated RPM signal results and is sent to the controller, when requested, by operation of block 296. Once having a validated RPM signal, the OPC may then perform certain tests such as checking for overspeed, as indicated by block 298. The signal is also output as a respective analog ASPD or BSPD signal as well as an RPM signal for display, by operational of block 300. If, however, the calculated RPM signal does not match the other two OPC signals, then block 302 will cause a negative calculated value to be transmitted to the controller when requested, indicating an invalid RPM signal which is removed from further participation in control operations, by the controller.

Figure 14:
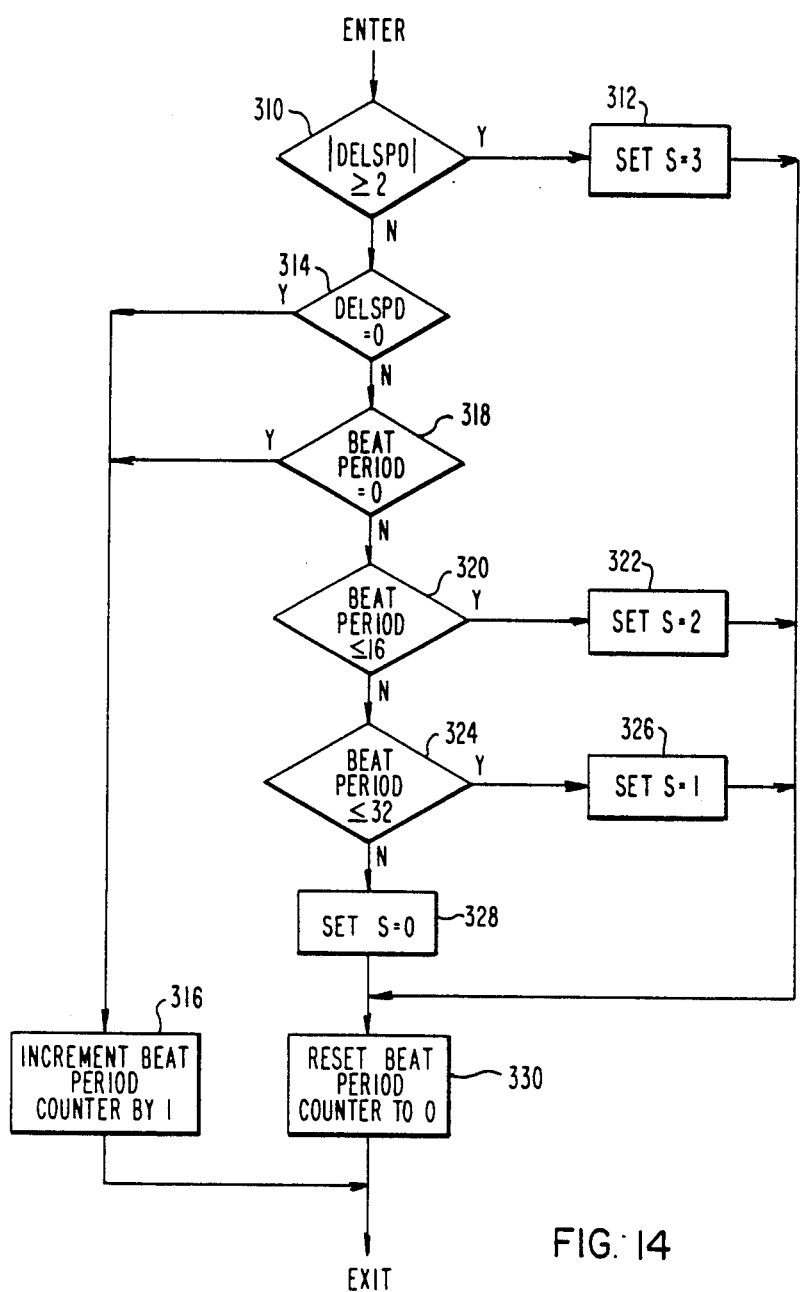
FIG. 14 is a program flow chart illustrating the operation of the adaptive filter arrangement.

Calculation of the bandwidth by proper selection of the value of S, as in block 284, based upon the value of DELSPD of block 282, is further illustrated in somewhat more detail in FIG. 14. Initially, the computer establishes a beat period counter operable to keep track of the beat period, such value being instrumental in the determination of the value of S.

Basically, by way of example four bandwidths may be established corresponding to S equal to 0, 1, 2 or 3, with the value of S being governed by the beat period. That is, the greater the beat period the narrower will be the bandwidth of the filter, and vice versa.

In FIG. 14 decision block 310 examines the absolute value of DELSPD, and if it is greater than or equal to 2, the value of S is set to 3 as indicated by block 312. If DELSPD is less than 2 it is tested to see whether it is equal to 0 in decision block 314, and if it is, the beat period counter which was established by the computer is incremented by 1, as indicated at block 316.

If DELSPD is not equal to 0 as indicated at decision block 314, the beat period counter is examined, as indicated at decision block 318, to see if it is equal to 0, and if it is, it will now be incremented by 1. If the beat period counter is greater than 0, it is tested to see if the count is less than a first predetermined number, at decision block 320, and if it is, the value of S is set to 2 as indicated at block 322.

If the beat period is not less than the first predetermined number, it is tested to see if it is less than a second predetermined number at decision block 324. Thus if the count in the beat period counter is greater than the first predetermined number and equal to or less than the second predetermined number the value of S will be set to 1 as indicated by block 326. If the value in the beat period counter is greater than the second predetermined number the value of S is set to 0, at block 328. After each setting of the S value the beat period counter is reset to 0, as indicated by block 330.

The first and second predetermined numbers utilized for testing in blocks 320 and 324 depend upon not only the scanning frequency but the speed range at which the designer wishes to change the value of bandwidth. By way of example the first predetermined number may be 16 and the second predetermined number may be 32.

In operation let it be assumed that the turbine has been running at some speed close to a harmonic of the scanning frequency resulting in a low beat frequency, in which case S=0 and a narrow bandwidth filer is applied. Every 1/640th of a second the DELSPD value is examined at block 310, and in the present example DELSPD is 0 such that the beat counter is incremented. With the same running speed the beat counter is incremented by 1 every 1/640th of a second and in this respect some maximum count greater than the second predetermined number may be established, in which case the beat period counter will be filled within one second. Suppose now that the speed changes such that DELSPD equals 1. Since the beat period counter is at its maximum value it will not equal 0 as indicated at block 318. The beat period is greater than 16 as determined at block 320 and is greater than 32 as determined at block 324 such that S is set to 0 and the narrow bandwidth is maintained. At this point, however, the beat period counter is reset to 0 by operation of block 330.

On a subsequent iteration the beat period counter will be incremented by one, either by operation of the DELSPD test in block 314 or the beat period test of block 318. Once the beat period counter is incremented by at least one, and the DELSPD changes, then the value of S will be set to 2 if the DELSPD change occurs when the beat period counter has a value of 16 or less and S will be set to 1 if the beat period counter has a value of 17 to 32. Any beat period value greater than 32 will cause the S value to be 0.

Thus any time the DELSPD value changes from 0, the beat period counter is tested so as to adjust the bandwidth of the adaptable filter. If the beat period counter has low values the bandwidth will be relatively wide (e.g. S=2) whereas if the beat period counter has relatively high values the bandwidth will be narrow (S=0). With this operation, and with three stages of filtering, extremely precise RPM values are obtainable, and measurable in reactions of an RPM, thus allowing extremely fine and accurate turbine control.

What is claimed:

1. An improved OPC arrangement for a turbine control system having at least one central controller in two-way digital data communication with a plurality of motive fluid admission valve control circuits for controlling motive fluid admission to the turbine, comprising:
    (A) at least three OPC circuits each including programmable digital computer means in two-way digital data communication with said controller;
    (B) at least three speed transducers positioned to derive respective output signals indicative of turbine shaft rotational speed;
    (C) each of said OPC circuit including circuit means operable to convert a respective one of said speed transducer output signals to a pulse waveform of a frequency greater than the frequency of the received speed transducer output signal;
    (D) means for counting the pulses of said waveform and for sampling the count in repetitive predetermined periods of time for transfer to said digital computer means;
    (E) said digital computer means being operable to calculate turbine speed and provide a turbine speed signal (RPM), in response to said counts transferred to it;
    (F) means for providing said turbine speed signal to said other OPCs, as well as said central controller;
    (G) said digital computer means being responsive to RPM signals received from other OPCs to validate its own RPM signal if it is in agreement with a predetermined number of other received RPM signals.

2. Apparatus according to claim 1 wherein:
    (A) said turbine is a steam turbine.

3. Apparatus according to claim 1 wherein:
    (A) each said digital computer means is operable to provide a first output signal indicative of a first overspeed condition if its validated RPM signal exceeds a first value; and which includes,
    (B) a first voting circuit responsive to said first output signals from all of said digital computer means of said OPCs to provide an output signal equal to the majority of its input signals.

4. Apparatus according to claim 3 wherein:
    (A) each said digital computer means is operable to provide a second output signal indicative of a second overspeed condition if its validated RPM signal exceeds a second value; and which includes,
    (B) a second voting circuit responsive to said second output signals from all of said digital computer means of said OPCs to provide an output signal equal to the majority of its input signals.

5. Apparatus according to claim 4 wherein:
    (A) three OPCs are provided; and
    (B) said second voting circuit is a 2 out of 3 voting circuit.

6. Apparatus according to claim 3 wherein:
    (A) three OPCs are provided; and
    (B) said first voting circuit is a 2 out of 3 voting circuit.

7. Apparatus according to claim 1 wherein:
    (A) each said pulse waveform has a frequency which is double the frequency of its respective speed transducer output signal.

8. Apparatus according to claim 1 wherein said circuit means of said OPC circuit includes:
    (A) means for receiving a stable clocking pulse signal;
    (B) divider means for dividing down said stable clocking pulse signal to obtain first and second clock signals;
    (C) means for filtering and clamping said speed transducer output signal;
    (D) a frequency doubler responsive to said first clock signal and said filtered and clamped speed transducer output signal to provide a pulse output signal of a frequency double that of said speed transducer output signal;
    (E) means for counting the pulses of said pulse output signal;
    (F) means responsive to said second clock signal to periodically sample and hold the output of said means for counting; and
    (G) means to transfer the sampled and held count to said digital computer means.

9. Apparatus according to claim 8 wherein:
    (A) said means for counting is a pulse accumulator which repetitively counts up to a maximum value and then starts counting over again.

10. An improved OPC for a turbine having at least one speed transducer providing an output signal indicative of turbine shaft rotational speed, comprising:
    (A) circuit means operable to convert said output signal to a corresponding pulse waveform;
    (B) means for counting the pulses of said waveform and for sampling the count in repetitive scanning cycles;
    (C) means for obtaining a difference signal indicative of the difference between two successive sampled counts;
    (D) means for filtering said difference signal;
    (E) means for changing the bandwidth of said means for filtering as a function of said rotational speed;
    (F) means responsive to said filtered difference signal to obtain an output signal (RPM) indicative of said rotational speed.

11. Apparatus according to claim 10 wherein:
    (A) said means for changing the bandwidth changes it as a function of turbine shaft acceleration.

12. Apparatus according to claim 10 wherein:
    (A) said means for changing the bandwidth changes it as a function of turbine shaft deceleration.

13. Apparatus according to claim 10 wherein:

(A) said means for changing the bandwidth changes it as a function of the difference between two difference signals.

14. Apparatus according to claim 13 wherein:
(A) said means for changing the bandwidth changes it as a function of the difference between two successive difference signals.

15. Apparatus according to claim 10 wherein:
(A) said means for filtering includes a plurality of LPF stages.

16. Apparatus according to claim 1 wherein:
(A) the frequency of said scanning includes no harmonics equal to the rated speed of said turbine.

17. Apparatus according to claim 16 wherein:
(A) the frequency of said scanning equals to 640 Hz.

* * * * *